United States Patent [19]

Zetterlund et al.

[11] 4,049,305
[45] Sept. 20, 1977

[54] CAB DOOR LATCH MECHANISM

[75] Inventors: Ture R. Zetterlund, Naperville; Arthur A. Amberg, Plainfield, both of Ill.

[73] Assignee: International Harvester Company, Chicago, Ill.

[21] Appl. No.: 716,482

[22] Filed: Aug. 20, 1976

[51] Int. Cl.² .............................................. E05C 3/26
[52] U.S. Cl. .......................... 292/336.3; 292/DIG. 25
[58] Field of Search ............... 292/DIG. 25, 216, 280, 292/198, 336.3

[56] References Cited

U.S. PATENT DOCUMENTS

| | | | |
|---|---|---|---|
| 2,536,295 | 1/1951 | Leonard, Sr. ................ | 292/DIG. 25 |
| 2,918,320 | 12/1959 | Janonis ....................... | 292/DIG. 25 |
| 3,201,164 | 8/1965 | Griswold, Jr. ............... | 292/280 |

Primary Examiner—Richard E. Moore
Attorney, Agent, or Firm—William H. Wendell; Floyd B. Harman

[57] ABSTRACT

A door latch mechanism for a tractor cab with a door having inside and outside wall and having one end pivotally attached to the cab. The mechanism includes a catch mounted on the door opposite the pivotal door attachment with the catch including a pivotally mounted engagement bias disengagement arm, an external handle mounted on the outside wall of the door between the latch and pivotal door attachment with the handle incorporating a pivotal activator for disengaging the catch while pivoting the door and a push lever driven by the activator to operate the catch, an internal handle mounted on the inside wall between the external handle and the catch for operating the catch from within the cab, and a rod assembly connecting the external handle, the catch, and the internal handle, with the rod assembly including a rod pivotally connected to the push lever and the catch and a one way lever connecting the rod and the internal handle.

2 Claims, 5 Drawing Figures

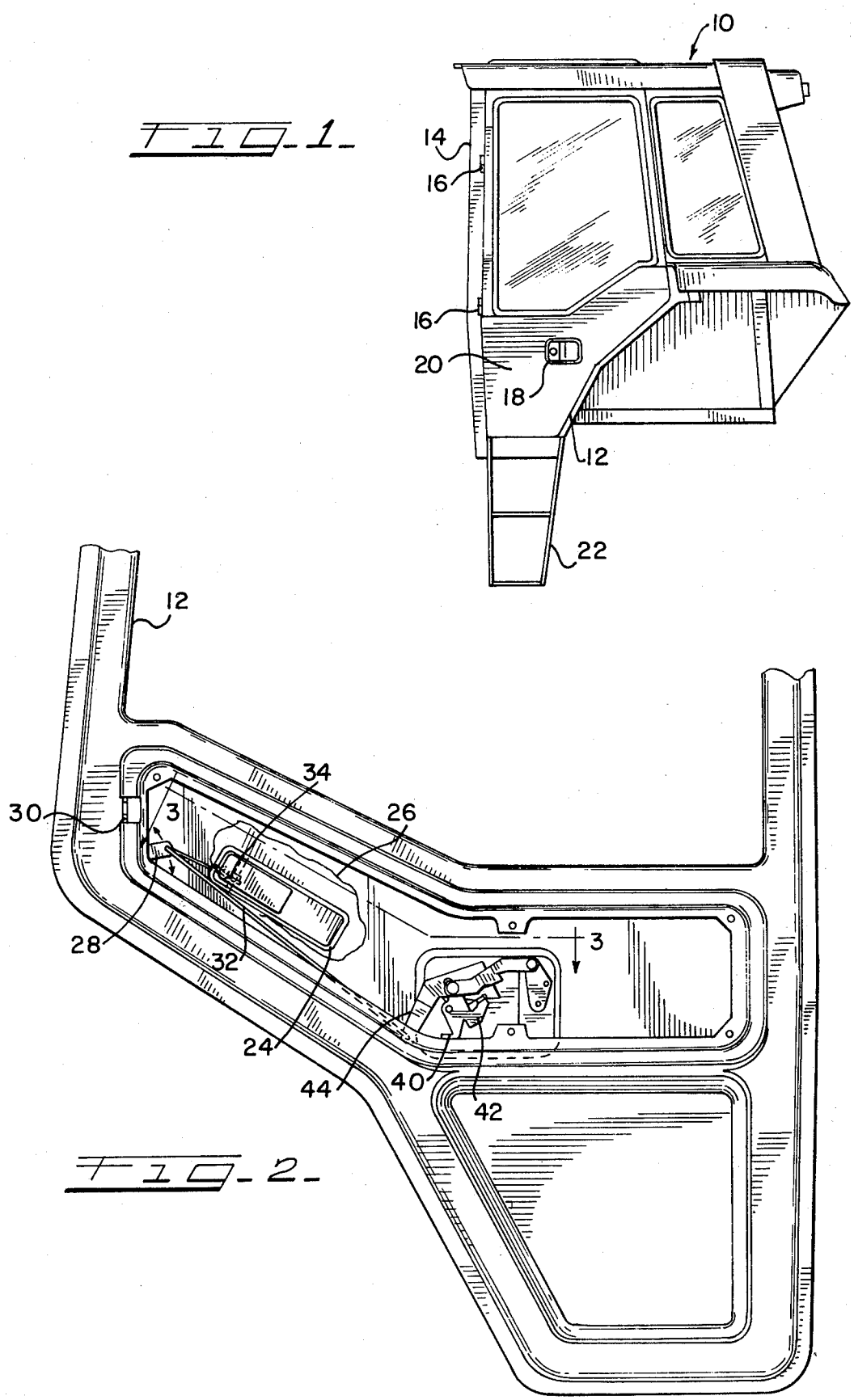

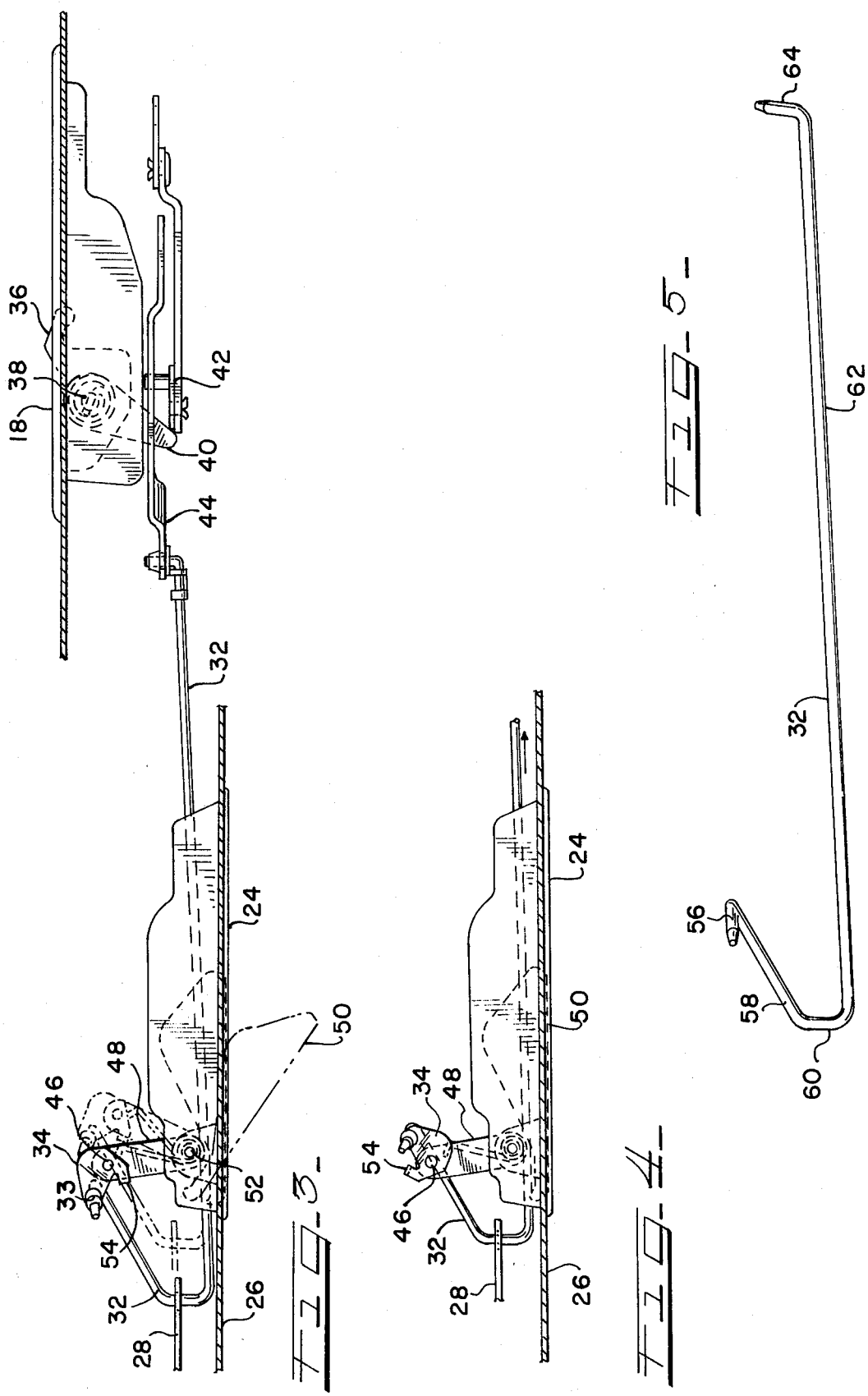

CAB DOOR LATCH MECHANISM

BACKGROUND OF THE INVENTION

This invention relates generally to door latch mechanisms, and more particularly, concerns a door latch mechanisms for a tractor cabs having internal and external handles.

In recent times increased emphasis has been placed on the comfort of the operator of a tractor. Two aspects of this emphasis have been to make the access and egress from the cab of the tractor as comfortable as possible, and making the cab esthetically pleasing to the operator.

The original cabs for tractors had doors which provided access and egress while protecting the operator from the elements, but the doors were rustic in character in that they had only an external sheet and an elemental door latch arrangement with nominal consideration given to the esthetics of the door and the comfort of the operator. To improve both these aspects of the cab door, an internal door sheet was added to remove the door structure from the operator's sight and a dual handle arrangement was developed to increase the ease in access and egress from the cab.

In examining the dual door handle arrangement, it was determined that the most convenient handles were those which would provide cooperating unlatching and door opening motions. In a tractor cab the external door handle will optimumly be one which is located near the hinge connection of the door and one which utilizes a pivotal unlatching motion, thereby providing the operator with a pull lever for opening the door after unlatching the door catch. Similarly, it was determined that the optimum internal handle for a tractor cab is one positioned further from the door hinges than the external handle and one having a similar pivotal unlatching action thereby providing a push point for opening the door from within the cab.

Since a tractor must be dependable in spite of its operation in a rugged terrain, the linkage arrangement for the dual handle cab door must be durable. The arrangement must also be reasonably serviceable to avoid accessive down times during harvesting and planting operations.

Accordingly, it is the primary aim of the present invention to provide a door's latch mechanism for a tractor cab which optimizes the ease of access and egress and the esthetics of the cab while maintaining the durability of the unit.

Moreover, it is an object of the present invention to provide such a door like mechanism that is also easily serviceable to minimize maintenance and repair time.

SUMMARY OF THE INVENTION

A door latch mechanism for a tractor cab with a door having inside and outside wall and having one end pivotally attached to the cab. The mechanism includes a catch mounted on the door opposite the pivotal door attachment with the catch including a pivotally mounted engagement bias disengagement arm, an external handle mounted on the outside wall of the door between the latch and pivotal door attachment with the handle incorporating a pivotal activator for disengaging the catch while pivoting the door and a push lever driven by the activator to operate the catch, an internal handle mounted on the inside wall between the external handle and the catch for operating the catch from within the cab, and a rod assembly connecting the external handle, the catch, and the internal handle, with the rod assembly including a rod pivotally connected to the push lever and the catch and a one way lever connecting the rod and the internal handle.

BRIEF DESCRIPTION OF THE DRAWINGS

FIG. 1 is a side view of a tractor cab having a door incorporating the present invention.

FIG. 2 is a side view of the cab door of FIG. 1 with the inside door panel removed.

FIG. 3 is a section along line 3—3 of FIG. 2.

FIG. 4 is a partial section taken along line 3—3 of FIG. 2.

FIG. 5 is a view of the rod of the present invention taken along line 3—3 of FIG. 2.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Turning first to FIG. 1 there is shown a tractor cab 10 incorporating a door 12 which is hinged to the cab body 14 by hinges 16. As is further shown in FIG. 1 the door 12 includes an external handle 18 mounted on the outside wall 20 of the door 12 immediately above the access ladder 22, thereby providing a handle which is easily accessible to the operator when he enters the cab 10.

The internal handle 24 of the door 12 is shown (see FIG. 2) to be mounted on the inside wall 26 of the door 12. FIG. 2 also shows the pivotally mounted arm 28 of the spring biased catch 30 and the linkage which connects the catch 30, inside handle 24, and the outside handle 18. In the illustrated form, this linkage consists of a rod 32 and a one-way lever 34.

When the operator wishes to gain access to the cab he will rotate paddle 36 (see FIGS. 2 and 3) counterclockwise about pin 38 which will rotate drive arm 40. Arm 40 will in turn rotate drive assembly 42 that abuttingly rotates push lever 44 which is pivotally connected to rod 32. This counterclockwise rotation of paddle 36 (see FIG. 3) will produce a counterclockwise rotation of push lever 44 as viewed in FIG. 2, thereby producing a clockwise rotation of arm 28 which disengages the catch 30.

During the operation of the external handle 18 as described in the preceding paragraph, the internal handle 24 will not have any rotational motion transferred to it by rod 32 since rod 32 is connected to the internal handle 24 by the preferred embodiments one-way lever 34, which is a bellcrank (see FIG. 4). The motion transmission is interrupted because the pivotal connection 33 of rod 32 to bellcrank 34 simply rotates the bellcrank about its pivotal connection 46 with the extension 48 of the internal handle 24.

When the operator desires to leave the cab, he will rotate paddle handle 50 clockwise about its mounting pin 52 (see FIG. 3). This rotation will in turn rotate extension 48 counterclockwise thereby causing the extension 48 to contact the abutment 54 of bellcrank 34. With the extension and bellcrank in this driving mode, the rotation of paddle handle 50 will move rod 32 thereby causing clockwise rotation of arm 28 and disengagement of catch 30. As with the operation of the external handle 18, the operation of the internal handle 24 does not cause motion in the paddle handle 36 of the external handle 18. This lack of motion translation results from the abutment drive relationship between push lever 44 and drive plate 42 leaving the push lever 44 free to rotate counter-clockwise about its pivot when driven by rod 32.

In connecting the catch 30 the external handle 18 and the internal handle 24, a solid rod 32 which is substantially hook shaped is used (see FIG. 5). The rod 32 in the present instance includes five distinct sections with the first section 56 being the pivotal connection to extension 48, the second section 58 being the section between extension 48 and arm 28, the third section 60 passing through arm 28, the fourth section 62 lying between arm 28 and push lever 44, and the final section 64 passing through push lever 44.

With the preferred embodiment utilizing a single rod to connect both handles to the catch, it is apparent that the present invention provides a door latch mechanism that is both serviceable and dependable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A door latch mechanism for a tractor cab with a door having inside and outside walls and having one end pivotally attached to said cab, said mechanism including, in combination:
   an engagement catch mounted on said door opposite said pivotal door attachment, said catch including; a pivotally mounted disengagement arm located between said inside and outside walls;
   an external handle mounted on said outside wall between said latch and said pivotal door attachment, said external handle including; pivotal activator means for disengaging said catch and pivoting said door, and a pivotally mounted push lever operably connected to said activator means and said catch;
   an internal handle mounted on said inside wall between said external handle and said catch, said internal handle including; a pivotal paddle handle, and a pivotally mounted extension operably connected to said paddle handle and said catch;
   rod means connecting said push lever, said catch and said extension, said rod means including; a one way lever mounted on said extension, and a rod pivotally connected to said one way lever, said catch and said push lever.

2. The door latch mechanism of claim 1, wherein:
   said one way lever is a bellcrank pivotally mounted on said internal handle, said bellcrank being pivotally connected to said rod and abuttingly connected to said internal handle to selectively contact said extension; and
   said rod is substantially hook shaped, thereby operably connecting said remotely located catch, internal handle and internal handle.

* * * * *